US007870022B2

(12) United States Patent
Bous et al.

(10) Patent No.: US 7,870,022 B2
(45) Date of Patent: Jan. 11, 2011

(54) SYSTEM AND METHOD FOR OFFERING AND FULFILLING SITUATION-BASED, LOCATION SPECIFIC REWARDS AND OFFERS TO MOBILE-ORIENTED CONSUMERS

(75) Inventors: Joseph Bous, Washington, DC (US); Elan Joel Blutinger, Washington, DC (US); Thomas M. Isaacson, Huntingtown, MD (US)

(73) Assignee: Alpine In Motion LLC, Reston, VA (US)

( * ) Notice: Subject to any disclaimer, the term of this patent is extended or adjusted under 35 U.S.C. 154(b) by 0 days.

(21) Appl. No.: 12/251,202

(22) Filed: Oct. 14, 2008

(65) Prior Publication Data
US 2009/0313109 A1 Dec. 17, 2009

Related U.S. Application Data

(60) Provisional application No. 61/060,988, filed on Jun. 12, 2008.

(51) Int. Cl.
*G06Q 30/00* (2006.01)
(52) U.S. Cl. .................................. 705/14.34
(58) Field of Classification Search ............. 705/14, 705/14.34
See application file for complete search history.

(56) References Cited

U.S. PATENT DOCUMENTS

| | | |
|---|---|---|
| 5,848,396 A | 12/1998 | Gerace |
| 6,014,634 A | 1/2000 | Scroggie et al. |
| 6,014,635 A | 1/2000 | Harris et al. |
| 6,068,183 A | 5/2000 | Freeman et al. |

(Continued)

FOREIGN PATENT DOCUMENTS

JP 2004/265294 9/2004

(Continued)

OTHER PUBLICATIONS

Michelle Speir, BlackBerry Pushes a Sweet Solution, Nov. 6, 2000, Federal Computer Week, pp. 40-42.*

(Continued)

*Primary Examiner*—John G Weiss
*Assistant Examiner*—Matthew L Hamilton

(57) ABSTRACT

A system, method and computer-readable medium are disclosed for advertising and completing a transaction using a credit card or a debit card. The method includes receiving situation information at a device, based on the situation information, transmitting an advertisement to the device, associating an advertisement with an identification card such as a debit card, credit card, student ID card, biometric data, or club card, and receiving an indication of a purchase associated with the advertisement and completed using the card. The disclosure enables a user to receive an advertisement on a device such as a mobile device and then make a purchase decision based on that advertisement in a normal fashion or transparent to the user and sales clerk, without the use of coupons, special codes or any other additional and annoying requirements for making the purchase. The user only needs to use an appropriate identification card. The merchant for the clerk at a point of sale handles the transaction in a standard fashion. The user can then receive a confirmation of a discount for the transaction on the consumer mobile device and later receive a rebate on an identification card statement.

19 Claims, 10 Drawing Sheets

U.S. PATENT DOCUMENTS

| | | |
|---|---|---|
| 6,330,543 B1 | 12/2001 | Kepecs |
| 6,408,307 B1 | 6/2002 | Semple et al. |
| 6,484,148 B1 | 11/2002 | Boyd |
| 6,487,538 B1 | 11/2002 | Gupta et al. |
| 6,505,046 B1 | 1/2003 | Baker |
| 6,526,335 B1 | 2/2003 | Treyz et al. |
| 6,546,257 B1 | 4/2003 | Stewart |
| 6,571,279 B1 | 5/2003 | Herz et al. |
| 6,587,835 B1 | 7/2003 | Treyz et al. |
| 6,601,037 B1 | 7/2003 | Kolls |
| 6,606,602 B1 | 8/2003 | Kolls |
| 6,672,507 B1 * | 1/2004 | Walker et al. ............... 235/456 |
| 6,711,474 B1 | 3/2004 | Treyz et al. |
| 6,775,539 B2 | 8/2004 | Deshpande |
| 6,795,710 B1 | 9/2004 | Creemer |
| 6,889,054 B2 | 5/2005 | Himmel et al. |
| 6,947,976 B1 | 9/2005 | Devitt et al. |
| 6,970,871 B1 | 11/2005 | Rayburn |
| 7,127,236 B2 | 10/2006 | Khan et al. |
| 7,200,566 B1 | 4/2007 | Moore et al. |
| 7,213,027 B1 | 5/2007 | Kominek et al. |
| 2001/0054066 A1 | 12/2001 | Spitzer |
| 2002/0035605 A1 | 3/2002 | McDowell et al. |
| 2002/0062246 A1 | 5/2002 | Matsubara |
| 2003/0028515 A1 | 2/2003 | Nishikado et al. |
| 2003/0028518 A1 * | 2/2003 | Mankoff ....................... 707/1 |
| 2003/0040959 A1 | 2/2003 | Fei et al. |
| 2003/0083941 A1 * | 5/2003 | Moran et al. ................. 705/14 |
| 2003/0182191 A1 | 9/2003 | Oliver et al. |
| 2003/0216960 A1 * | 11/2003 | Postrel ........................ 705/14 |
| 2004/0002897 A1 | 1/2004 | Vishik |
| 2004/0073482 A1 * | 4/2004 | Wiggins et al. ............... 705/14 |
| 2004/0203852 A1 | 10/2004 | Janskiraman |
| 2004/0249712 A1 | 12/2004 | Brown et al. |
| 2005/0075932 A1 * | 4/2005 | Mankoff ....................... 705/14 |
| 2005/0097005 A1 | 5/2005 | Fargo |
| 2005/0131761 A1 | 6/2005 | Trika et al. |
| 2005/0234771 A1 * | 10/2005 | Register et al. ............... 705/14 |
| 2006/0015405 A1 | 1/2006 | Bala et al. |
| 2006/0178932 A1 | 8/2006 | Lang |
| 2006/0258397 A1 | 11/2006 | Kaplan et al. |
| 2007/0073589 A1 | 3/2007 | Vergeyle |
| 2007/0088610 A1 | 4/2007 | Chen |
| 2007/0088801 A1 | 4/2007 | Levkovitz et al. |
| 2007/0103993 A1 | 5/2007 | Mount et al. |
| 2007/0140176 A1 | 6/2007 | Bachenberg |
| 2007/0143177 A1 | 6/2007 | Graves et al. |
| 2007/0174120 A1 * | 7/2007 | Asmar et al. ................. 705/14 |
| 2007/0192182 A1 | 8/2007 | Monaco et al. |
| 2007/0264991 A1 | 11/2007 | Jones et al. |
| 2007/0270165 A1 | 11/2007 | Poosala |
| 2007/0288313 A1 | 12/2007 | Brodson et al. |
| 2008/0004888 A1 | 1/2008 | Davis et al. |
| 2008/0010114 A1 | 1/2008 | Head |
| 2008/0033817 A1 | 2/2008 | Billmaier et al. |
| 2008/0033857 A1 | 2/2008 | Moses |
| 2008/0082424 A1 | 4/2008 | Walton |
| 2008/0097851 A1 | 4/2008 | Bemmel et al. |
| 2008/0288406 A1 * | 11/2008 | Seguin et al. ................. 705/50 |

FOREIGN PATENT DOCUMENTS

| | | |
|---|---|---|
| KR | 2002/094340 | 12/2002 |
| KR | 2006/061515 | 6/2006 |
| KR | 2006/083825 | 7/2006 |

OTHER PUBLICATIONS

"Digital Island Corrects and Replaces Previous News Release, BW2059, CA-Digital-Island", Business Wire, Jan. 22, 2001.

"AOL Digital City Kicks Off Major Expansion to Widen Lead in Fast-Growing Local Online Market", Business Wire, Mar. 21, 2000.

"WindWire Launches WindCaster; Wireless Ad Network Delivers Marketing and Advertising Over the New Wireless Web Medium", Business Wire, Jun. 27, 2000.

Launch of WindWire Undisputed Success; Leader in Wireless Advertising Solutions Serves Over One Million Ads With Click-Through Rates of More Than 15 Percent in First Week of Launch:, Business Wire, Oct. 17, 2000.

"Alcatel Introduces Advanced Version of Its Intelligent Location-Based Server", Canadian Corporate News, Mar. 20, 2001.

"Smart AdServer Targets Quova for Geolocation Needs; Adserving Innovator Switches to Quova for Reliability and Depth of Data", CCNMatthews Newswire, Feb. 5, 2008.

Susan Glairon, "New Marketing Scheme Brings Online Ads to Boulder, Colo., Wireless Customers", Knight Rider/Tribune Business News, Aug. 6, 2000.

Sarah Littman, "On the Verge: The Users are Catching Up with the Technology in the U.S. Mobile Marketing Arena. Are You Ready to Capitalize on a New Marketing Medium that is Almost Ready for its Close-Up? (Mobile Technology)", Response, Feb. 1, 2008.

"Personalized Information to Mobile Users—Add2Phone and Setec to Co-Operate in Mobile E-Commerce", M2 Presswire, Apr. 20, 2000.

Sarah McCammon, "Ladies, It's Your Night for a Bargain (Neighbor)", Daily Herald (Arlington Heights, IL), Feb. 5, 2004.

"The Next Wave in Advertising", New Straits Times, Jul. 2, 2000.

Sanjay Parekh, "Personalization: Turn Browsers Into Buyers: Gathering Customer Intelligence is an art and a Science (Customer Relationship Management)", e-Business Advisor, Sep. 1, 2002.

"[x+1] Personalizes Web Optimization with New, Patented Technology", PR Newswire, Sep. 18, 2007.

"Power of Real Time (Brief Article)", Crain's New York Business, Oct. 30, 2000.

* cited by examiner

MERCHANT REGISTRATION

NAME: [　　　　　　　　]
ADDRESS: [　　　　　　　　]
STATE: [　　　] ZIP: [　　　]   ⎫
PHONE: [　　　　　　　　]      ⎬ 252
PIN: [　　　　　　　　]         ⎭

CARDS ACCEPTED:

⦿ VISA  ○ AMEX  ○ CLUB CARD  ○ MASTER CARD  } 254

OTHER [　　　　　　　　]

[ REGISTER ] — 256

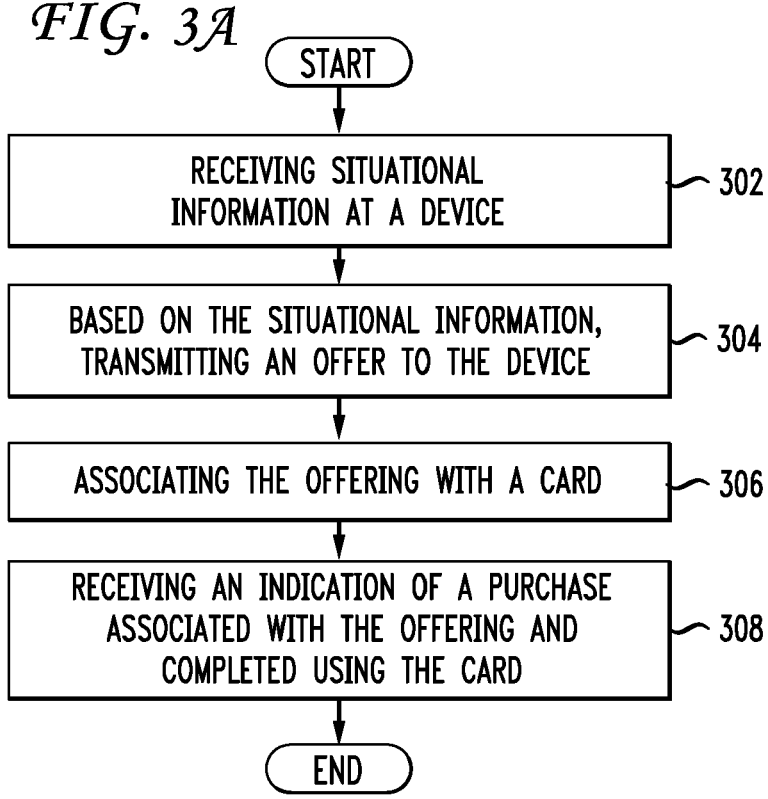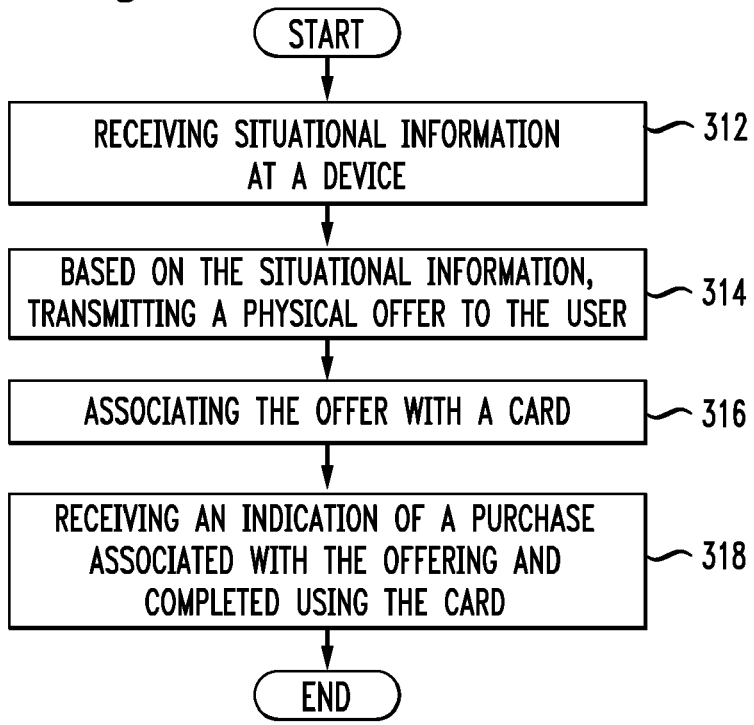

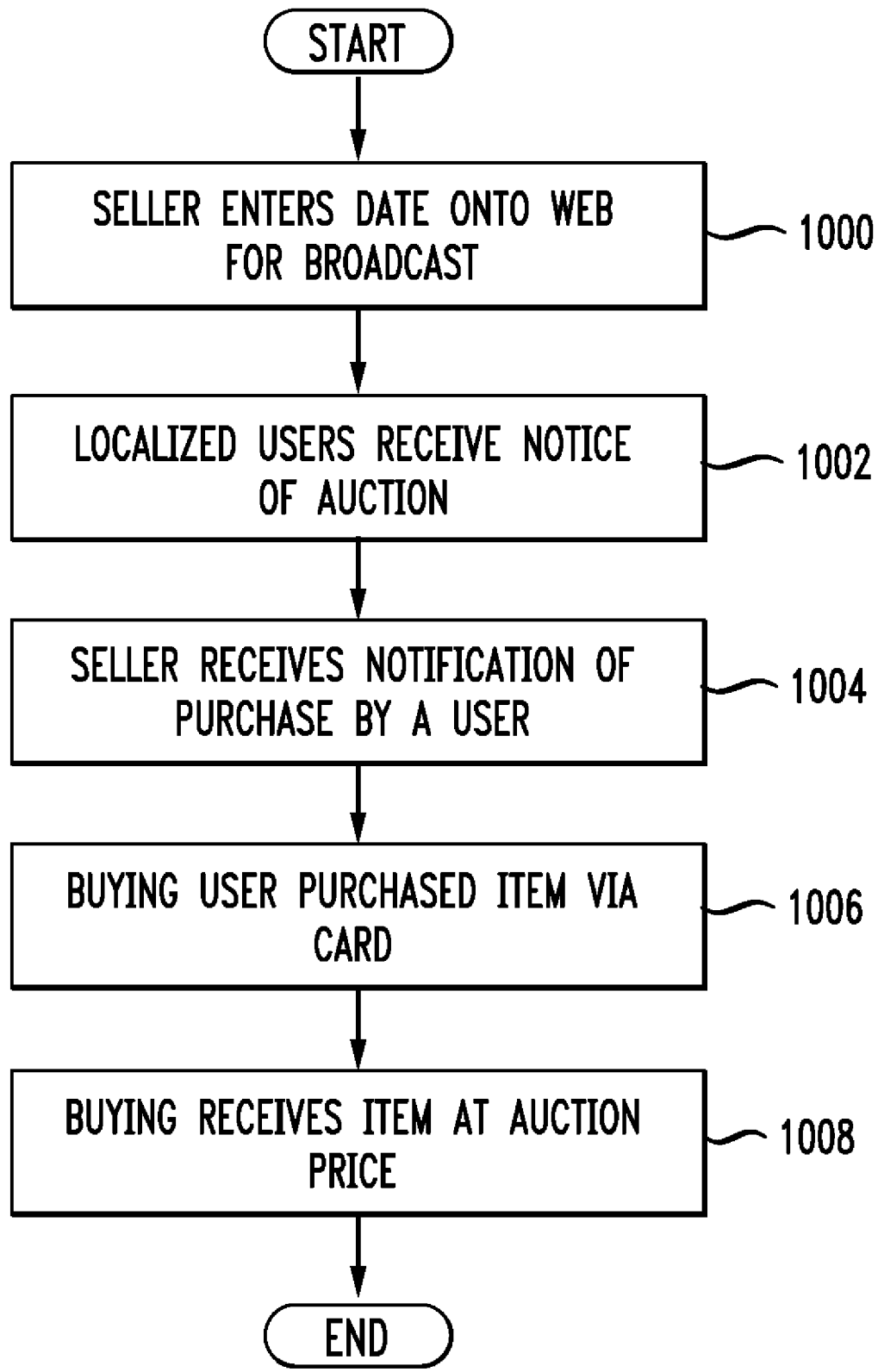

SYSTEM AND METHOD FOR OFFERING AND FULFILLING SITUATION-BASED, LOCATION SPECIFIC REWARDS AND OFFERS TO MOBILE-ORIENTED CONSUMERS

PRIORITY CLAIM

The present application claims the benefit of U.S. Provisional Application No. 61/060,988, filed Jun. 12, 2008, the content of which is incorporated herein by reference in its entirety.

BACKGROUND OF THE INVENTION

1. Field of the Invention

This invention is related to the field of offering discounts and rewards to consumers, and more specifically to associating an identification of a user via a card such as a credit card to an advertisement and offering rewards to members of a particular payment processing system based on situation information which can relate to a device, a consumer and location of that consumer.

2. Introduction

Payment processing companies such as American Express, Visa, Mastercard, Diners, etc. as well as specific banks such as Citibank, Chase, Bank of America search to differentiate themselves by offering exclusive offerings to their customers. American Express may offer a global discount to all customers at a particular merchant for using an American Express Card when transacting with the merchant. For example, American Express offers 5% off of all orders at a flower company by simply using the American Express. By employing this method, the Payment Processing Company delivers value to the Card Member and drives sales for the Merchant. All the while, the Card Company pushes more transactions onto the Credit Card. This method of promotion is standard in the industry but does not address a variety of merchant concerns. Specifically, the merchant is forced to offer the discount to every Card Holder despite the fact that the customer may have been willing to buy the product for the regular price and/or already decided to use the card of the card company. In a better scenario, the merchant seeks to offer the discount only to customers that qualify for a discount based on what that customer is doing and the location of that customer.

In addition to these global discounts offered by the Payment Processing Companies, a variety of companies are offering mobile discounts to consumers directly on their mobile device based on their location. In this scenario, the consumer would be pushed a virtual coupon to their mobile device. The consumer would then present this virtual coupon to the merchant. This method of promotion has not worked well since using the virtual coupon is difficult for the consumer, the clerk, and the merchant. The consumer finds it difficult to communicate the coupon to the clerk in the shop and the merchant Point of Sale system is not equipped to handle the coupon. Thus, this method improves the delivery of the offer to only location based customers but most merchants are not equipped to process the discount.

What is needed is an informal method of improving and simplifying the completion of a purchase transaction associated with location-based advertising.

SUMMARY

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

This disclosure addresses the specific desire that merchants have to send consumers situation-based and location based offers and use their existing payment processing system (i.e. credit card processing) to fulfill the transactions. The "situation" refers to any data that can relate to the current state or situation of a device or a consumer. For example, the situation may be the state of a vehicle (low on fuel) or the situation of a consumer (6 months since your last haircut), or the situation of the environment (it rained in New Jersey and Pennsylvania). Further, the disclosure addresses the payment processing company's desire to attract customers to use their credit card—increasing membership and encouraging transactions. Another advantage is that the system simplifies the fulfillment requirements of the merchants and enables them to refine their promotion offering beyond simply location based offerings. Merchants want deeper insight about the "situation" of the customer that is in their area. For example, merchants actively attempt to catch the customer at the right moment when they need to buy gas, get a haircut and so forth.

Embodiments of the invention include systems, tangible computer readable media, computer readable media and methods associated with the interaction of presenting offers to users on mobile devices and managing the purchase of items or services based on the offers in a standard manner for the user and the merchant. In other words, the transition renders the experience transparent to the user and the clerk at the point of sale with regards to fact that a discount or rebate is being offered. There are no coupons or other interaction needed.

A method embodiment includes a method of advertising and completing a transaction including receiving situation information at a device. The method includes, based on the situation information, transmitting an advertisement to the device, the advertisement being associating with an identification card such as a credit card, and receiving the indication of a purchase associated with the advertisement and completed using the card. The card is associated in advance with the advertisement such that there is no interaction needed from the user to "accept" or take advantage of the offer other than to make the purchase using the card. An example application of this embodiment includes receiving situation information that it is time for an oil change of a user's vehicle. Based on that situation information and perhaps on other situation information regarding the location of the user and/or the vehicle, the system presents an offer for a reduced cost of an oil change at a local service center. An identification card such as a credit card is associated with the offer prior to its transmission. In response to the offer, the user proceeds to the service center and purchases the oil change with a standard credit card, debit card, or other type of card. The merchant or clerk in the store may be unaware of the offer for a reduced price and process the transaction in the normal fashion. This capability relieves any administrative burden being placed upon the merchant. The user may ultimately receive an indication of the purchase associated with the advertisement and completed using the card either on the mobile device or alternatively on a statement associated with transactions using the card at a later date. In some cases, the merchant may provide notification of items for sale or that the merchant desires to highlight and enables an advertisement to be transmitted. The ultimate transaction can be transparent to the user and the clerk regarding any rebates or discounts. Because the offer is associated with the identification card in advance, when that card is used to complete the purchase, the system coordinates the successful response to that offering and continues to process the discount/rebate accordingly. No user interaction with the device is necessary, although some user interaction may occur as disclosed herein.

Another embodiment relates to a unified effort associated with a grouping of businesses. An example method illustrated in this embodiment includes receiving an indication from a first store of a purchase of a product, analyzing information associated with the first store and purchased product relative to at least one other store in a community of stores comprising the first store and the at least one other store, presenting on a user device a specific offering associated with a product at the at least one other store, and, if the user purchases a product associated with a specific offer, providing a rebate to the user. Similar notifications can be provided either on a user device or on a later statement to the user highlighting the rebate provided for the products that were purchased and associated with the advertisement. This embodiment enables both situation information and standard processing of transactions to aid a community of stores in a strip mall or other grouping of stores, to seek to increase traffic and sales for the grouping of stores. The specific offering is also associated with a card such that the user only needs to user the card to take advantage of the rebate. Therefore, a Safeway Card or Blockbuster card may be used and the benefit of the offering is automatically provided.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only exemplary embodiments of the invention and are not therefore to be considered to be limiting of its scope, the invention will be described and explained with additional specificity and detail through the use of the accompanying drawings in which:

FIG. 2D illustrates an example interface for merchant registration;

FIG. 3A illustrates an example method embodiment;

FIG. 3B illustrates another example method embodiment;

FIG. 10 illustrates a method embodiment associated with an auction.

DETAILED DESCRIPTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Figure 1:
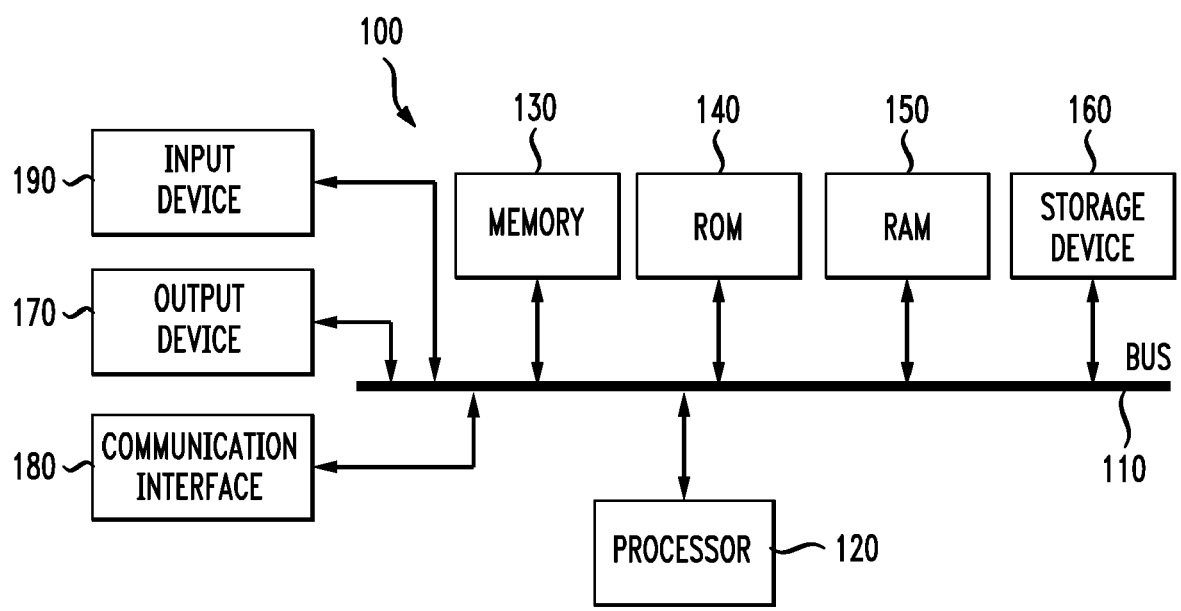
FIG. 1 illustrates an example system embodiment.

With reference to FIG. 1, an exemplary system includes a general-purpose computing device 100, including a processing unit (CPU) 120 and a system bus 110 that couples various system components including the system memory such as read only memory (ROM) 140 and random access memory (RAM) 150 to the processing unit 120. Other system memory 130 may be available for use as well. It can be appreciated that the invention may operate on a computing device with more than one CPU 120 or on a group or cluster of computing devices networked together to provide greater processing capability. The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices such as a hard disk drive 160, a magnetic disk drive, an optical disk drive, tape drive or the like. The storage device 160 is connected to the system bus 110 by a drive interface. The drives and the associated computer readable media provide nonvolatile storage of computer readable instructions, data structures, program modules and other data for the computing device 100. The basic components are known to those of skill in the art and appropriate variations are contemplated depending on the type of device, such as whether the device is a small, handheld computing device, a desktop computer, or a computer server.

Although the exemplary environment described herein employs the hard disk, it should be appreciated by those skilled in the art that other types of computer readable media which can store data that are accessible by a computer, such as magnetic cassettes, flash memory cards, digital versatile disks, cartridges, random access memories (RAMs), read only memory (ROM), a cable or wireless signal containing a bit stream and the like, may also be used in the exemplary operating environment.

To enable user interaction with the computing device 100, an input device 190 represents any number of input mechanisms, such as a microphone for speech, a touch-sensitive screen for gesture or graphical input, keyboard, mouse, motion input, speech and so forth. The device output 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on the invention operating on any particular hardware arrangement and therefore the basic features here may easily be substituted for improved hardware or firmware arrangements as they are developed.

For clarity of explanation, the illustrative system embodiment is presented as comprising individual functional blocks (including functional blocks labeled as a "processor"). The functions these blocks represent may be provided through the use of either shared or dedicated hardware, including, but not limited to, hardware capable of executing software. For example the functions of one or more processors presented in FIG. 1 may be provided by a single shared processor or multiple processors. (Use of the term "processor" should not be construed to refer exclusively to hardware capable of executing software.) Illustrative embodiments may comprise microprocessor and/or digital signal processor (DSP) hardware, read-only memory (ROM) for storing software performing the operations discussed below, and random access memory (RAM) for storing results. Very large scale integration (VLSI) hardware embodiments, as well as custom VLSI circuitry in combination with a general purpose DSP circuit, may also be provided.

The system description above relates to the basic components of a computing device or other device which may relate to a component of a system embodiment of the invention. Other basic hardware components may also be employed where appropriate. For example, in the discussions below various devices will provide situation information. For example, a vehicle may provide situation information associated with the mileage of the vehicle or how much gas is in the vehicle. The components necessary to both sense the particular situation and transmit the particular state to a separate receiving device may differ from the basic components set forth above relative to a computer. A local store may have a computer system that provides situation information of a listing of customers that have not had a haircut for over 6 months, or not had a teeth cleaning for over a year. Situation information may also be received from other bureaus and relate to other general information such as when it last rained in particular zip codes. The situation information may be viewed as a filter for the advertisement.

Accordingly, depending on the particular hardware configuration or the various components used to receive and process situation information, the system aspect of this invention may encompass known hardware components depending on the individual type of situation information and individual devices that are interactive to carryout the various functions described herein.

Figure 2A:
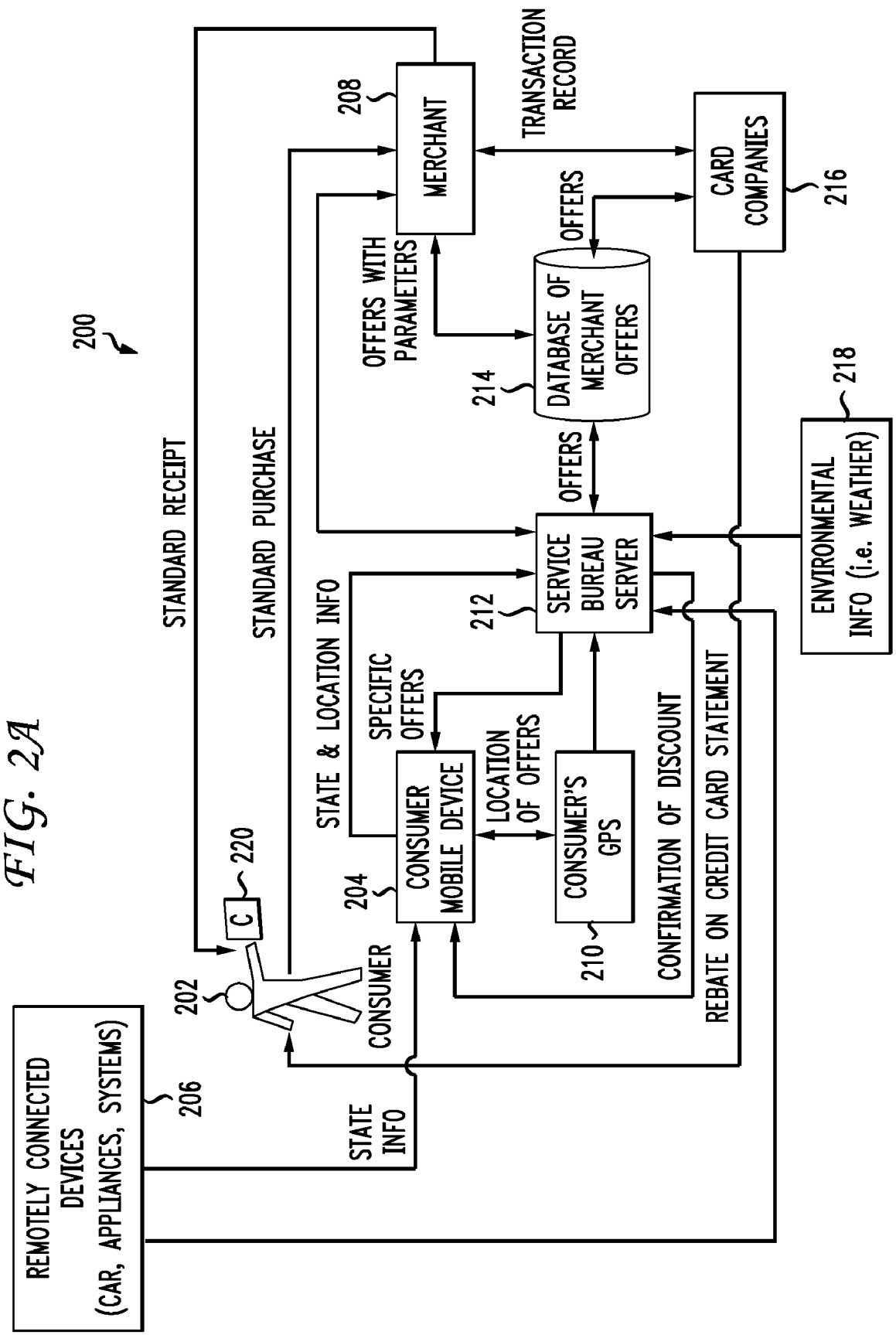
FIG. 2A illustrates a network according to an embodiment of the invention.

As is noted above, a first embodiment disclosed herein relates to utilizing location and/or situationally-based information to present offers to consumers on a device which may be a desktop computer, laptop computer, mobile device, pager, or any other type of device which may be used to communicate with a user. A general system 200 is shown in FIG. 2A. Situation information is shown as originating from a device 206. As noted above, this device may be a car, a computer, a refrigerator, and so forth. This device is meant to represent any kind of device that has "situation" information that can be communicated to the service bureau 212. The delivery mechanisms may vary as well. For example, the On-Star service may be able to provide situation information about a particular vehicle to the service bureau 212. Various devices may communicate via various protocols to the service bureau and provide the necessary situation information.

Presenting the offers on a device can be accomplished in a number of ways. Simple text may be used or a listing of offers may be collected and the user can then access the list. In one aspect, the system filters and organizes the offers for the user such that when they access the list, they are organized and easily viewed. The offers can also be integrated into a website viewed by the user. For example, they may be presented as banner ads on a website by the user. They can be organized and presented to the user as part of their account on a website where they can easily view the offers. If the offers are web-based offers, there can be "single click" purchasing of accepting of offers available. The particular card used for a single click purchase can be predetermined based on the card company making the offer. Thus, while some single click purchasing websites keep a single card on file to use for the purchase, this disclosure provides a contrast where there may be a number of cards available and the card used is the one that has processed the situation information and is willing to provide the discount for the purchase. The user may call a service and receive an audio listing of the offers. They of course may appear on a mobile device. In one aspect, whatever form the interaction takes with the user, the interaction will inform the user regarding which card to use to obtain the discount. For example, the interaction will say or present data that tells the user to redeem the offer by using their visa card. The interface may present a button to click to redeem with visa, or another button to click to redeem with Mastercard. The advertisement generally speaking will include instructions on how to close the deal.

In one aspect, a user could register various devices. In this aspect, the service bureau can develop a record and maintain improved situation information for the user. If a user registers a vehicle, a home computer, appliances such as a dishwasher and refrigerator and a mobile device, then situation information can be received and coordinated. If the car transmits situation information that it is low on oil, and the situation information from the mobile device indicates that the user is in the vicinity of the auto mechanic, then that combined situation information acts as a filter to help trigger an advertisement from the auto mechanic for an oil change. Because the user is registered, the advertisement is pre-associated with the user's identification card to enable an easy conclusion to the transition. The group of devices registered for the user may also enable the coordination of the situation information to further filter and identify advertisements. As a user registers, they are also given the opportunity to manage the level of situation information provided. For example, they may indicate that they want to transmit the situation information of the vehicle regarding its gas level and oil level but not its location. If a doctor or dentist registers to provide situation information, the user may restrict the information to be the number of months since their visit and not any information about the nature of the last visit. Thus, the registration process is used to provide control to the user regarding the level of granularity of the situation information. An easily accessible website is available for the user to add or change situation reporting data on a device or entity by entity basis. This model is based on pushing information from each registered device or entity to the service bureau 212. A pulling model is discussed next.

Assume a user has not registered any devices or entities with the service bureau but would like to receive special offers. In this case, an embodiment covers the ability of the user to pull advertisement and dynamically provide situation information to receive advertisements. A user may call or access the system in any manner and provide their location and other situation information and receive offers. A user may provide, for example, their location and the fact that they are low on gas via a phone call, an interaction with a browser on a mobile or desktop device or any other device. They can provide a zip code (whether they are in the zip code or not) and their desired product or service. In another aspect, the user may have one or more registered devices but may want to provide additional situation information. Therefore, this aspect enables the user to supplement existing situation information. For example, if the user is going to take a long drive and the situation information for their vehicle has not yet sent data indicating that they are low on fuel, the user can override or supplement this situation information and receive offers based on that data. The affinity of the advertisement algorithms may also be adjusted based on this dynamic user input to generate offers to the user where otherwise, based on passively received situation information, the system may not send any offer. Therefore, the system may operate in a fully push mode (automatic situation information generates ads), a fully pulling mode (the user provides manually all situation information) or a hybrid mode where a combination of pushed data and pulled requests are used to generate offers.

In another example, situation information includes environmental information from a source 218, information about external objects, and/or situation information regarding a level of gas in a user's vehicle from a source 206. The situation information may be gathered from several different places such as over the internet, over a plug-in or wireless communication with the vehicle communication unit while the vehicle is in the user's garage or elsewhere, and so on. Situation information also can include the location of the user or user device 204 via any mechanism such as their GPS 210. The particular manner in which situation information is provided is independent of the concepts disclosed herein and many mechanisms may be known by those of skill in the art for gathering situation information. In this example, assume that the situation information also exists regarding the location 210 of the user in the vehicle. Once this particular situation information is received, the systems presents to the user via one or more user devices 204 or via a device in the vehicle an offering indicating that the gas tank is low and that the consumer is within a few miles of a merchant 208. A card such as a credit card or club card is already associated with the advertisement. This connection of the card with the advertisement or offering enables the simplification of the realization of rebates, discounts and so forth while allowing the purchase of an advertized item to be completed in the normal fashion. No user interaction with the device is necessary to accept or act on the offering. In this regard, the user only needs to purchase the item using the card, and the information is communicated to the system to process the discount or rebate. For example, the sale is transparent to the store clerk and perhaps to the user that there is a special price or rebate that exists. This is because there are no coupons, barcode or any special action that needs to occur to receive the benefit other than using the card.

Another aspect of the preceding example is to utilize also the situation information from the external source 218. Here, the system may know that the last car wash purchased was 6 months ago and also may receive situation information that it rained 218 in the local zip code where the user lives and works and drives. Location information may indicate that the vehicle was not in the garage during the rain storm. Therefore, the situation information may be combined with other situation information to filter the offers.

A discount or other advertisement may be presented based on situational information. The discount may be generated in a negotiation with a merchant 208 or may be generated independent of the merchant and be offered based on the requirement that the purchase be based on a particular credit card such as American Express. The user, upon viewing this advertisement, can then simply proceed to purchase the gasoline at the merchant location 208 using the selected credit or club card 220 and then receive the discount. In this regard, the discount may be primarily a discount offered by the credit card company 216, the merchant 208, or a combination thereof For example, a particular consumer may have registered one credit card or a number of cards such as a credit card, debit card and club card. The particular offer may be selected based on situation information about the user, a device, merchant inventory, and different card companies and their affinities for providing offers. Given a set of circumstances, American Express may present a discount in an offer for a certain product. The offering then would state "Buy Cereal today only for 10% off at Safeway—use your American Express card [or Visa, or debit card] to get the discount." Card companies can then control what offers they provide. If a merchant is making the offer and the offer is card agnostic—they offering may essentially be: "Buy Cereal today at Safeway for a discount of 10%". Any identification method may then be used. Any card that is registered or dynamically used to identify the user, biometrics, etc. may be utilized to achieve the discount and connect the user to the offering. In this alternative, the pre-association with the offering may not be limited to a card but may include a pre-association with the user herself. In this case, if the user registers her biometric or PIN or other identification data, then upon receiving an offering, the user could use biometrics, or the PIN etc. to identify him or herself and then use cash to buy the product, but the connection and discount is provided via the identification mechanism, although there is no card.

The disclosure now returns to the primary embodiment of using an identification card associated with the offering. The transaction is completed in a standard fashion such that the merchant at a point of sale may or may not be aware of the offering. The fact that a discount or rebate is being offered can be transparent to the store clerk and/or the user. In one aspect, inasmuch as most gas pumps also receive credit card or debit card purchases, another aspect of this embodiment may involve communicating electronically with a particular pump that is used once the known credit card is inserted into the gas pump. In this regard, even a notification can be presented to a user at the gas pump thanking the user for responding to the advertisement and notifying the user of the discounted price based on their response to the particular offering. Those of skill in the art will understand the basic components necessary to communicate data to a network node regarding the user's being at a particular pump and selecting an appropriate message to transmit to the gas pump for that user. Any point of sale device may be used to receive data and present messages to the user as appropriate. Other aspects include notifying the user on a mobile device or other device and/or presenting a notification to the user in a later statement associated with the credit card or other card, highlighting the discount offered. As can be appreciated, the connection between the offering to the user and the user's card enables the service bureau 212 to manage the transaction for the merchant.

Another example, the situation information may indicate that 3,000 miles have been driven on the car since the last oil change. In a similar manner, an offer can be presented for an oil change and transacted in the normal process with appropriate notifications and discounts as disclosed herein. The situation information may relate to weather 218 conditions indicating that rain or snow has fallen or is expected. In an example of how the offering may be based on a state associated with the weather, the system may wait a day until the conclusion of the storm and then present an offer for a car wash for users living and/or working in the area of a storm. The offer is redeemed merely by using the appropriate card to purchase the car wash. Any outside data such as time of day, whether it is the weekend, information on news or sporting events, etc. may be used to trigger a notice to the user.

Another example relates to the consumer 202 using a club card 220. One example of the club card may be any kind of an identification card, such as a Blockbuster™ card or a club card for a grocery store such as Safeway™ or Giant™. Thus, users may use cash or a credit card but swipe some kind of identification card which can be utilized to connect the user with the presentation of an offer. Situation information is received from various sources 206 and/or 218. These sources may include location based devices such as the consumer mobile device 204, cars, appliances, systems, computer systems, and so forth. Examples of situation information have been provided above, and feature 206 represents all different types of situation information which may be provided to a service bureau 212 and/or the consumer mobile device 204. For example, other environmental information 218 may be provided such as the weather, news, RSS feeds, etc. via other information bureaus at feature 218. Furthermore, in this example, the mobile device 204 can also provide situation and/or location information to a service bureau 212. The service bureau 212, having received situation information from both the mobile device and/or other sources 218 and/or 206, may interact with a database of merchant offers 214 which is generated based on communication with one or more merchants 208 and card companies 216, such as American Express, Visa, Mastercard, Safeway Club Card, and so forth. Each of a number of cards may be associated with an advertisement or a particular card may be selected based on a number of factors. Thus, the message may be, "Buy Milk today for a discount, use any card" or "Get 10% of your Milk Purchase when you use American Express today."

A strict "card" is also not required. For example, in some stores, users may provide a PIN number that identifies them. Thus, there is no requirement that the "card" be a physical card swiped at a point of sale. No physical card needs to be provided. The system may simply have an account for the user in which the user identifies him or herself via a PIN or biometric data. The PIN or biometric data can be coordinated with a credit card or debit card such that the offer is completed for that card and discounts are provided. In the example set forth above, once the appropriate situation information arrives at the service bureau center 212 that may trigger an offer, the specific offer is provided from the service bureau 212 to the mobile device 204. Device 204 may be a desktop computer as well. The particular location of the received offer is searchable. The user then utilizes the card 220 to make a standard purchase with the merchant 208. This is accomplished because of the association made in advance connecting the card 220 with the offering. Thus, the service bureau 212 may communicate to the merchant information about the sale. In this regard, there does not need to be any coupon or any difference at the point of sale regarding the transaction. This provides a benefit inasmuch as at the point of sale the merchant does not need to know anything regarding the specific offer, and does not to do anything different with regards to finalizing the transaction. A standard receipt can be issued to the user 202. Then, at a later time, a rebate and/or notification of the reduction may be provided on a credit card statement from the card company 216 to the consumer. A receipt provided at the point of sale may notify the user of the discount or present other information associated with the offer. Furthermore, the service bureau center 212 may send a confirmation of a discount to the mobile device 204 which can highlight to the user the discount that they received upon making the purchase after receiving this specific offer. The card companies 216 may also communicate offers and records back and forth between the database of merchant offers 214 and a particular merchant 218. This basic illustration of the interaction between various components in the network 200 provides for an efficient mechanism to identify a targeted offer to a consumer based on appropriate situation information and enable the completion of a transaction based on that offer in the most simple and normal process.

It is noted below, one aspect of this disclosure involves engaging the user to provide a location of a particular offer to both drive the use of a particular credit card and/or promote the consumer's purchase at a particular merchant that may be performed on either the mobile device 204 or separate consumer GPS device 210 such as a Garmin® device. For example, GPS device 210 may be registered with the service and thus enabled to provide location information to the bureau 212 (or to the device 204 via a connection such as Bluetooth) that can then be analyzed as one situation of information, perhaps in connection with other situation information (car is low on gas, 6 months since last teeth cleaning, etc) to trigger the transmission of an offer to the device 204.

Another aspect involves providing the merchant location where the user can redeem the offer to a GPS or mobile device with driving directions so that a consumer can quickly find the merchant. In this regard, an aspect of this disclosure involves potentially engaging in a dialog with a user. In many cases, the location of a particular offering may be known to a user and such information may be identified and gathered based on historical data. For example, if a user is known to live two blocks from a gas station, then it is unlikely that a user would necessarily need directions to the gas station where the offering is being presented. However, in some situations, the user may be far from home and need driving directions so that the consumer can quickly find the offer location. The system may have a threshold established wherein a dialog may be initiated with the user in which a mobile device 204 can have an offer presented for a reduced price of gas, wherein the system knows that the user is on a trip and is far away from home. An interactive button can request whether they want directions to the gas station. If the user responds "yes", then the system may either present directions in a known manner to their mobile device or the system may communicate directly with a GPS device in the vehicle, to provide the data with the address of the destination which would immediately alter or update the instructions for brining the user to the appropriate merchant where the offer is provided.

When the consumer 202 is ready to purchase the offered item, the consumer 202 preferably purchases the product at the full price offered to any other customer. The discount would be rebated to the consumer directly to their credit card. By doing so, the merchant clerk and the consumer transact normally—thus eliminating the need to train clerks or change any point of sale systems.

In another aspect of the disclosure, while the clerk at the store may process the transaction in the normal fashion, the consumer may receive notification of the rebate directly on a receipt, on their mobile device, or perhaps be presented on a screen display at the merchant location. The particular method in which the user receives notification regarding the discount or any result of the advertisement or offering is flexible according to the present invention.

Figures 2B, 2C:
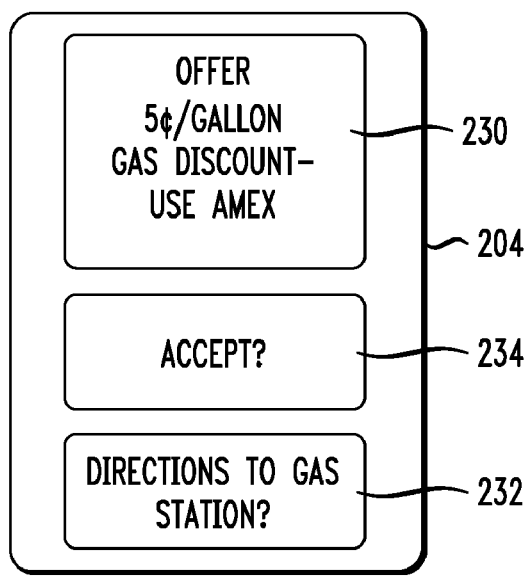
FIG. 2B illustrates an example offer on a mobile device.
FIG. 2C illustrates an example user interface enabling a person to register a card for the advertising service.

FIG. 2B illustrates an example of this approach. Device 204 presents an offer 230 for 5¢ per gallon gas discount using a credit card. Button 232 asks whether the user wants directions to the gas station. Again, historical data may be utilized to simply as much as possible. The dialog with the user in this regard, the historical data may involve previous known transactions using the particular credit card. For example, even if a user is far from home, because of the association of both the location information and other situation information with the user of a particular credit card, the credit card company may know that the user has been, for example, to a particular gas station at Yellowstone National Park. If this is the case, then inasmuch as a purpose of the interaction is to enable a simple and focused offering and consumption of a transaction, the system may not present a dialog to the user regarding the location of the local gas station, but only present the offering to the user as they approach the gas station knowing that they have previously been there. Thus, there may be much information that can be stored regarding historical experiences with the user which then may be analyzed and used to drive whether a dialog ensues with the user and if so, even what level of complexity to engage the user. Also as is shown in FIG. 2B, the system can present an accept button 234 that enables the user to accept the offer and proceed to the store to purchase the product or services. The accept button 234 of course is optional. In some offerings, the most efficient approach is merely to inform the user to use card X to redeem the offering. In one aspect, such as where a dentist may have a slot open for a cleaning, it is desirable to receive input from the user accepting the offering. In many cases, however, the system only needs to present notice of how to redeem and no interaction is necessary. It is noted, however, that this user interaction does not affect the underlying concept that the identification card or account is associated with the user prior to the transmission of the offering. Thus, while the user may accept the offering via button 234, the completion of the transaction is still capable of being performed without coupons, scanning any bar-coded device or card, etc. Any interaction of this type can provide additional information and data from the user (i.e., hold the item at the store since it has been "sold" to a buyer on their way) but is preferably performed in the context of the basic principles disclosed herein.

As noted above, an aspect of the invention involves associating a card with a particular advertisement. To achieve this association, the information regarding a club card or a credit card must be received or identified in advance. This receipt of information regarding such a card may be performed automatically or manually. For example, in an automatic setting, a user may be presented with a notification or a request to associate preexisting and stored credit card information with the ability to receive discount advertisements based on that information. For example, a PayPal account, an Amazon.com account, and so forth may already store all of the necessary information and a particular mechanism may be provided in which the user can be presented with the option of registering one or more credit cards for the available service.

FIG. 2C illustrates a user interface 236 that enables a user to register a card for discount advertisements. For example, field 238 enables a user to include name, address, state, phone number and so forth. Fields 240 enable the user to enter a mobile device ID and whether the particular user interface is for the current device upon which the interface is being presented to the user. In other words, this mobile device ID enables the user to input information about a Blackberry device, an I-phone, a cell phone, a PDA and so forth which enables the association of the mobile device and advertisements sent thereto to the particular card, such as the credit card. Field 244 enable the user to input card ID information such as Visa, American Express, a club card or other and the card number. There may be other information that might be necessary given the particular circumstances and the particular identification card which the user desires to connect. For example, a Safeway club card may be identified via the user's telephone number. Such that when a particular card is entered that automatically the necessary information for that type of card can be gathered via the interface with the user. Once this information is provided, the user can then register via button 246 and thus provide the basic information that enables the association of the identification card with the particular advertisements or promotions that are transmitted to a user.

Similar to FIG. 2C, the merchant 208 will also register with the service bureau. The merchant 208 can register using a form on a user interface similar to that shown in FIG. 2C. Registering the merchant provide a mechanism to enable them to communicate data with the card companies 216 and provide offers to the database of merchant offers 214. While situation information is received with regards to devices and consumers and other outside data, situation information may also be provided from merchants to the service bureau 212. Triggers can be established in this case where an offering may be selected from the database 214 when inventory on a certain item hits a certain level or the inventory has aged for a certain amount of time. For example, a grocery store can provide inventory information and date information such that offerings on their cans of tomato soup are triggered after the current inventory has been in the store for 4 months. Other situation information, discussed elsewhere herein, for service providers such as hair salons and dental offices can be communicated to the service bureau 212 via this mechanism to tie in their scheduling software with situation information that an opening exists for 2:30 PM for a cleaning, therefore triggering the transmission of offers to individuals within a 5 mile radius of the office.

FIG. 2D illustrates an interface 250 that enables a merchant to register for interaction with the system for being able to present or be involved with the offerings. Some merchants may not accept all forms of credit cards. In this window 250, the merchant can provide basic information 252 and also indicate which cards they accept 254. The merchant can then register 256 for the service. Of course, not shown in FIGS. 2C and 2D is other information that would or could be gathered about users and/or merchants to enable the service to operate as disclosed herein. Window 250 shows that this merchant accepts visa, clubcards and mastercards. The system can then integrate offerings with merchants that accept the appropriate cards. For example, if an offering comes from AMEX, then the system would not include those merchants that do not accept AMEX in the presentation to consumers. However, once registered, no integration of merchant systems is necessary. The service can manage the purchase transaction.

In the example set forth above, where preexisting credit card information may be utilized, a brief dialog may ensue with the user in order for the user to identify a particular mobile device, or other device, which represents the device 204 used to receive particular offers. Thus, the interface would simplify the process by utilizing preexisting credit card information and only gathering the necessary information in order to enable the situation-based offerings to be presented to the appropriate convenient device for the user.

The disclosure returns momentarily to FIG. 2A. Mobile device 204 may also not be mobile. In one aspect, the device 204 is a desktop computer, lap-top computer or other non-mobile device. Information associated with the device 204 that connects the device to the user and the user's card number may be stored locally or in a network server. For example, once a user logs into his or her desktop computer 204, a cookie or other data may be transmitted to the network server such that the system knows the particular user is using a browser. Now, the network system can transmit advertisements based on any of the principles disclosed herein. The advertisements are associated with a card prior to the delivery of the advertisement. This knowledge provides the system to gather valuable data regarding the user's buying habits. For example, if an advertisement is placed on a website the user is viewing such as cnn.com for a local sale on couches, and the system knows that the particular user has viewed this advertisement (via a mouse-over or predicting that the user is viewing the page where the advertisement is placed, etc.), then when the user actually purchases the couch, the system therefore knows that the user has acted upon the presented advertisement. Thus, the principles of this disclosure enable a type of "click-through" knowledge that does not depend on the user actually clicking on the advertisement. Data can be analyzed and aggregated to improve the real-life "click through" on ads where the user does not purchase a product on-line but will go to a brick-and-mortar store to act upon the advertisement. Without the pre-association of their cards such as a credit card or debit card there is no knowledge of whether that advertisement was successful. Of course, the principles of offering a rebate are equally applicable in this aspect and such an offer and how it is redeemed as well as the simplicity of the approach at the point of sale.

Therefore, in one aspect, using the data we have through a cookie or other source of information about the user, the system can simply present a "view-based" advertisement on the display that does not require any user interaction. For example, the system can present an advertisement on the display of a particular user that informs the user of a discount at store X if they purchase with their AMEX card. The redemption information is important in this case. The user then only needs to see the ad and go make the purchase without ever interacting with the ad. The merchant system also does not need to receive data about the ad or coupons since the service manages the discont.

Further features can be enabled via this underlying technology. For example, a user at their desktop computer receives an advertisement for a couch at ACME distributors. The advertisement on the computer includes a click option for the address and a map with guidance on how to get to the store to be automatically transferred to the user's mobile device. Since the system is aware of the various user devices, the system can coordinate the advertisement and instructions on how to get to a store. Therefore, the user simply clicks on the desktop advertisement to instruct the system to send the details, map, etc. to their mobile device. The mobile device can then have a preprogrammed address into an application such as Mapquest or similar functionality such that the information on how to get to the store is prepared and ready on their mobile device. A specially branded logo can be included in the ad informing the user that the ad comes from the card based system. The user then simply takes his or her mobile device on the road and follows the directions on the screen, without the need to enter in an address or perform a series of steps that would otherwise be needed to get the address information into the mobile device.

A system, method and computer-readable media are disclosed for advertising and completing a transaction using an associated credit card or a debit card. An example method is shown in FIG. 3A. The method includes receiving situation information at a device (302), based on the situation information, transmitting an offering to the device (304), associating the offering with a card, such as a credit card, debit card, club card or other card or identification method (306), and receiving an indication of a purchase associated with the offering and completed using the card (308). The disclosure enables a user to receive an advertisement on a device such as a mobile device and then make a purchase decision based on that advertisement in a normal fashion, without the use of coupons, special codes or any other additional and annoying requirements for making the purchase. The user only needs to use an appropriate credit card or other type of card such as a student ID. In fact, no physical card has to be created. A person may have an account and an account number that they provide but never receive a physical card. With an account, biometrics such as fingerprints or retinal scans may be used as the "identification card" to identify the user. Accordingly, it is not necessary that a physical card exist to practice the invention unless specifically claimed. The merchant for the clerk at a point of sale handles the transaction in a standard fashion such that the fact of the discount or rebate is transparent to the store clerk merchant system and/or the buyer. The user can then receive a confirmation of a discount for the transaction on the consumer mobile device and later receive a rebate on a credit card statement.

FIG. 3B illustrates another aspect of the method embodiment which involves using a club card. In this example, a user will have a club card such as a Safeway club card or a Blockbuster club card that is used at the time of a purchase. This method embodiment comprises receiving same information at a device (312), and based on the situation information, transmitting a physical offer to the user (314), and associating the offer with a card (316). In this regard, the situation information may be received and the offer may be provided via the mail, a coupon, a receipt received at a store, such as a grocery store or a movie rental store, and so forth. The paper coupon is in advance associated with the card. Thus, the user may receive an offering in the mail that simply includes the notification that the offer can be redeemed by using a particular card. Thus, if the user receives an offering for a discount on cereal at the grocery store in the mail, then the user does not need to carry the coupon or present the coupon to redeem the offer but can simply user their club card associated with the grocery store in order to retrieve the benefit of the offer. Finally, the method includes receiving an indication of a purchase associated with the offering and completed using the card (318). Thus, the transaction is processed in the normal fashion, but without the need to remember, carry or present a coupon to a clerk at the merchant store. Therefore, the merchant computer system does not need any modification or programming to process the purchase based on the card.

One benefit of the above aspects of the invention involves a tracking mechanism. In this case, offers and redemptions can be tracked based according to a credit card. Thus, a report can be generated which can identify the success of particular types of advertisements associated with a particular user, i.e., associated with a particular user's credit card. In this regard, improvements and modifications to the type of advertisements, the timing, and so forth may be provided by the service bureau 212 and presented to merchants 208 and credit card companies 216 in order to approve the efficiency and responsiveness to any particular offer.

The method may also be practiced in connection with a website. For example, the advertisement may be transmitted to the user to buy a particular book or electronic equipment. The user, rather than proceeding to a physical storefront, may make the purchase on the Internet such as via Amazon.com. Here, the use of the particular credit card or identification card can be tracked as well as at a physical point of sale such that the discount and benefit can be provided. Here, the system may incorporate additional windows or interactions with the user to inform them that the system recognizes this as a response to the advertisement. For example, if the user purchases a book via amazon.com's one-click purchase, the confirmation window may include additional information that the discount for this purchase is $X due to your responding to the advertisement sent that morning. Accordingly, all of the concepts associated with the point of sale are applicable when the sale is a web-based sale.

Figure 4:
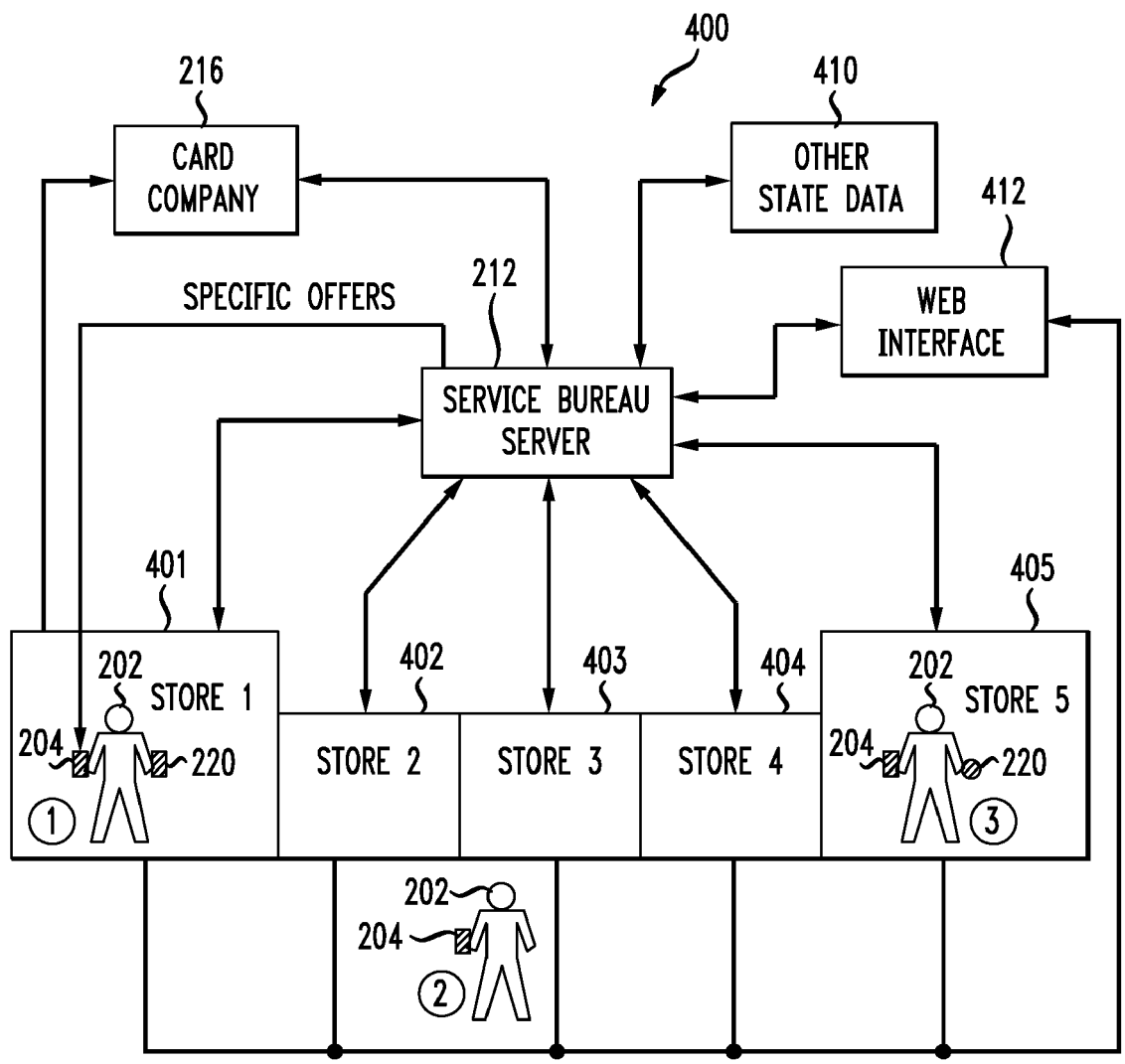
FIG. 4 illustrates an embodiment associated with a community of businesses.

FIG. 4 illustrates another aspect of the present invention and operates in the context of a community of businesses. Shown in FIG. 4 is an example series of stores 400 shown as Store 1 (401), Store 2 (402), Store 3 (403), Store 4 (404), and Store 5 (405). Preferably, these stores 400 would be grouped in a manner to those of skill in the art. For example, they may be a strip mall or represent a mall or any group of stores in which the vitality of the individual businesses often depend upon each other. For example, Store 1 is shown as a larger store because it may be an "anchor" tenant such as a grocery store or a large department store in a mall. Similarly, Store 5 may also be another strategic type of tenant such that often when users come to Store 1 or Store 5 they will also often purchase items from Stores 2, 3 and 4. In this regard, the overall vitality of the community of businesses 400 may depend on people attending or shopping at more than one store in a shopping visit. The principles disclosed elsewhere herein can apply in a unique manner to this scenario.

Figure 5:
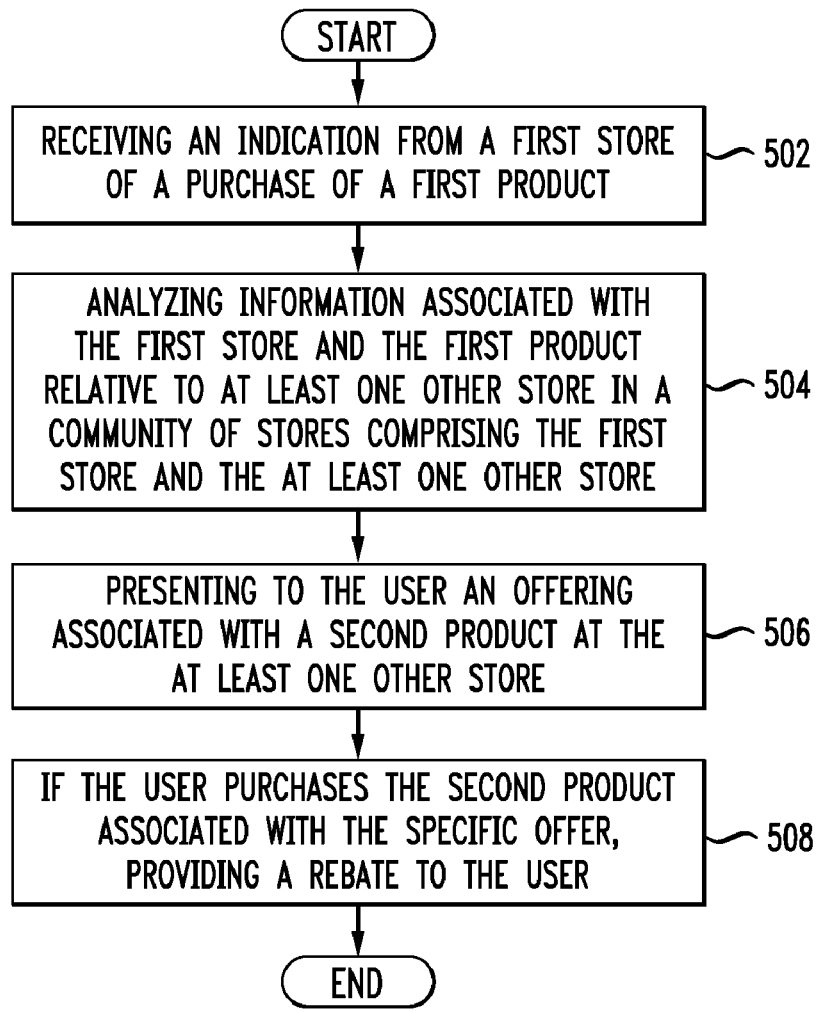
FIG. 5 illustrates another method embodiment of the invention.

The location based dynamic presentation of advertisements on a device 204 can occur based on situation information associated with a person's location and purchasing decisions. Each of Stores 1-5 (or the stores that register for the service) will communicate data to and from a centralized location such as at the service bureau server 212. The data may include such information as inventory, specials, hours of operation, sales, and any other type of business related data. In this regard, stores may be able to provide a database of products that they desire to move quickly and are willing to negotiate lower prices on. In an example scenario, a user 202 has both a mobile device 204 as well as a card such as a credit and debit card, club card, and so forth 220. FIG. 5 will also be referenced in the discussion. As shown in step 502 of FIG. 5, the user makes a purchase in store 1 at point 1. As an example, let's assume that the user uses their credit card 220 to purchase popcorn, potato chips and root beer. Since it is generally assumed that a person that shops at Store 1 will likely shop at one of the other stores 2, 3, 4 or 5, the data associated both with the use of credit card 220 can be transmitted to the credit card provider as well as purchase information can be transmitted to server 212. Knowing the types of products just purchased by the user, a database can be queried or a negotiation occur in which Store 5, which for purposes of this example we will assume to be a video rental store, may consider it a likelihood that the person 202 may go to Store 5 and rent a video. Thus, an analysis (504) may be performed.

To drive this behavior, a specific offer (506) may be provided from the server 212 to the device 214 after the purchase of the popcorn, potato chips and root beer. Inasmuch as the user is out shopping, and perhaps was indecisive about whether to rent a movie for that night, the presentation of an advertisement of some type may then urge the user to rent the movie at Store 5. In this regard, the user at point 2 would move toward Store 5 and at point 3 would rent a video using credit card 220 while likely still having their device 204. The sale or reduction in price for the user may come via the use of credit card 220 as is disclosed elsewhere herein. Other mechanisms may also be provided inasmuch as there is a coordinated effort between these stores to promote sales. For example, the user may have a Safeway Club Card 220 or a Blockbuster card that is used when they purchase items or rent movies. Thus, while in a preferred embodiment, the rebate would be provided to the user on a credit card receipt at a later time, because a user typically identifies themselves via a Blockbuster card or through the use of a driver's license when renting a movie to thus identify the user, other mechanisms may be provided without any additional work on the part of the user to obtain the benefit of the specific offer.

Thus, the user may receive notification in Store 1 of an offer related to products in Store 5, the offer coming either via a print out on the back of a receipt, via their mobile device 204, or other mechanisms, and be able to redeem that offer in Store 5 by either using their credit card, or a club card, or simply purchasing with cash. In other words, because Stores 1-5 are connected via the service bureau, the user may simply receive an advertisement or an offer to rent a video, and inasmuch as the user is registered in the video store 5, the user may simply rent the movie and receive the benefit and the rebate associated with the offer because once that user rents a movie even using cash, their name must be brought up in that database and thus the essential point is that there is some kind of identification that is provided in Store 5 which may occur in the context of a video rental store, because the user is already entered into a database. In other words, Store 4 may be a hair salon in which if a user pays cash, there is no mechanism to identify the user. Therefore, in this case, it would be necessary for the user to redeem an offer from another store in the community of stores by using a credit card or a club card that would provide a mechanism to report back to the service bureau 212 of that particular user making a purchasing decision. No change or integration with a merchant system is necessary.

In another example, assume the user in Store 5 rents a video but purchases no food or popcorn. Once the service bureau 212 receives notification that the person in Store 5 has rented a movie but made no purchase, while the user is walking as illustrated at point 2, the timing of an advertisement may be made based on the distance between stores, the location of the user, and so forth, in order to determine whether it is appropriate to present a specific offer to the user. For example, the system may present an offer for popcorn or candy, redeemable at Store 1 if they purchase within the next two hours. The user 202 and the clerk at Store 1 would not have to do anything different with regard to making a standard purchase. In one aspect, the purchaser would use a credit card 220 to make the purchase and thus receive a rebate through notification on their statement at a later date. The merchant computer is not involved and does not need to receive knowledge of a coupon or discont when processing the sale. In another aspect, if a user identifies herself using a Safeway Club Card or similar card, then that information can be communicated to the server 212 and the appropriate rebate can be shown the printed receipt as it often occurs for participants in the Safeway Club Card.

In another aspect of this embodiment, other intelligence can be provided to the server 212 from an outside source of other state/situtation data 410. Examples of this type of data can be information identifying the weather, the time, current events, and so forth. For example, if it is known that a sports event, such as the Super Bowl, is being played that weekend, there may be particular types of advertisements that can be coordinated for the various stores. In another example, if it is known that the weather is going to be inclement that weekend, then specific offers can be provided to users to purchase specific products to prepare for bad weather. In another aspect, utilizing both inventory information for Store 1, as well as, environmental data or other data regarding the weather, the system 212 can improve customer relations by providing notices to users of a lack of available products. This may be, for example, if prior to the arrival of a storm, Store 1 runs out of bread or milk. Similarly, if Store 5 is a video store, and a number 1 rated movie is completely checked out of the store, then users approaching the store may receive notifications of an unavailability of a certain movie with offers for reduced or special rates on rentals that are available. This can improve customer care inasmuch as users do not arrive at the store and then become frustrated when the movie they desire is unavailable. Of course, user personal data may be gathered and utilized in making special specific offer decisions. For example, rental histories, purchasing histories and so forth may be gathered and used in the analysis of when it is appropriate to present a specific offer to a user. A web interface 412 is provided in association with another aspect of the disclosure set forth below with regards to appointments or time slots for service providing merchants.

FIG. 5 illustrates a method embodiment of the invention in connection with FIG. 4. In this embodiment, a method includes receiving an indication from a first store of a purchase of a first product or service (502), analyzing information associated with the first store and the first product/service relative to at least one other store in a community of stores comprising the first store and the at least one other store (504), presenting an offering to the user associated with a second product at the at least one other store (506), and if the user purchases the second product associated with the specific offer, providing a rebate to the user (508). The offer may be printed, such as on the back of a receipt, presented on a mobile device, audible, or presented in any other manner. This embodiment differs from other embodiments disclosed herein in which the specific offer or advertisement presented on the device 204 is triggered by a purchasing decision from at least one store that can be associated with, in some respect, a community of stores.

An aspect of this invention involves individual stores in the community of stores 400 registering with the service 212 in order to both provide data associated with the state of their store and desired sales to be made as well as provide opportunities to have advertisements delivered to users that have as an object to urge consumers to go to the respective store.

In another example, assume in FIG. 4 that Store 3 is a hair salon. Information provided from the server from Store 3 may include when the last time a user 202 got a haircut and used a credit card 220 to pay for the haircut. If that period of time is three or four months and it is an appropriate time to urge the user to come in for another haircut, then when the user is in Store 5 and rents a movie, and via the use of credit card 220 or identifying the person via their movie rental account as being the same person that got a haircut four months earlier, then the system can present a specific offer to device 204 urging the user that it is either time for a haircut and there is an opening or providing a reduced price to urge the user to come in and schedule a haircut. This information may come from store inventory or via a web interface 412. The system can also provide such granularity of information so that wherein a scheduling of seats could know when there is an opening and then do a query to the server 212 to see who amongst all of the consumers in the community of stores 400 would be the most appropriate. The system then sends several advertisements indicating that there was an opening at the hair salon in 30 minutes and they will receive a reduced price by responding. In this regard, additional functionality can be provided in which an accept button may be provided on device 204 in which the user can immediately accept the appointment and attend the appointment in the case of the hair salon where there is no account that the user needs to provide in terms relative to the movie rental shop, the user can automatically have a discount provided via the use of the credit card and thus the point of sale transaction is no more difficult than it would be otherwise. An illustration of this ability is provided below in connection with FIG. 6.

As can be seen, such an approach in terms of a community of stores 400 may also apply in other venues such as dentist offices or merchant offices. The community of stores may be broader than merely a strip mall or a mall, but may encompass an entire downtown area in which various stores register information and in the example of a dentist office and the like, if there are openings for cleanings and the records show that a user has not been in for six months to receive a cleaning, then a brief notification can be provided to a user that there is an opening in one hour at the office for a cleaning and that they can get a reduced price if they press the accept button and arrive at the designated time. This can provide a much easier mechanism for efficiency both in terms of running small businesses such as hair salons or dental offices as well as efficiencies for users who happen to be in the area and shopping and may desire to save time by filling an available slot for the various services.

Figure 6:
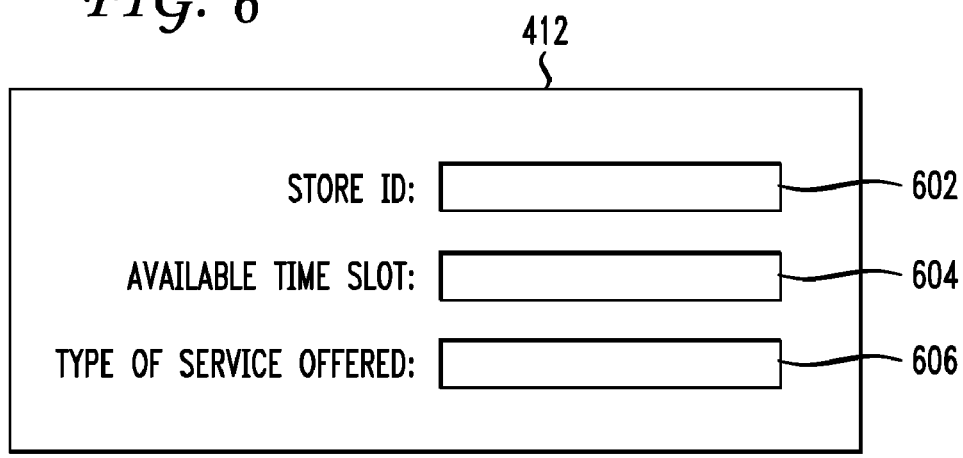
FIG. 6 illustrates a user interface enabling a store owner.

FIG. 6 illustrates an example web interface 412 in connection with FIG. 4. The context of this web interface is to enable a person at any of the stores in the community of stores shown in FIG. 4 to easily be able to provide real-time data to the service bureau server 212 which receives situation and location information about users in the community and can provide the specific offer to those users. Thus, in an example, if a dental office or hair salon has an open slot for a particular type of service, they can easily provide a store ID in a field 602, the available time slot in a field 604, and the type of services offered 606. This information is communicated to the service bureau 212 which can then generate a specific offer to the user as set forth above. Thus, a method of providing the specific offers to users in this context includes receiving via a web interface information associated with the availability of a product or service, communicating that information associated with a store to a server, generating a specific offer based on the information associated with a store and situation and/or location information associated with a user, transmitting a specific offer to a device associated with the user, receiving an identification of the user after having received a product or service and purchasing the product or service, and providing notification of a rebate or discount. As noted above, an aspect of this disclosure is that the user can receive the specific offer on a device such as a mobile device or on a printed receipt, engage optionally in an interactive dialog with the device in which the offer is accepted, and proceed to receive the services in a normal fashion.

Thus, in a concrete example, if a dental office has an available time slot for a cleaning, and has optionally registered for this service, a worker at the office can simply enter a store ID, the available time slot, and enter in that the services offered is a cleaning. There may be pre-populated menus which may make these available options easy to enter. Thus, once the information about the available time slot is entered, the information is communicated to the server 212 at which point the server will identify various individuals within the community based on the situation data which here would include location data as well as data perhaps received from the dental office of services due and can intelligently determine where to send offers. This may be done in conjunction with other information about the particular store. Thus, returning to FIG. 4, it is noted that if store 4 is the dental office, that the information shown being communicated from the dental office to the service bureau may include patient information, which on a privacy basis can be redacted or reduced such that only the timing of visits and other simple data may be provided rather than personal medical information, such that the server 212 may know which patients of the dental office have not been in for a cleaning for more than six months. Thus, once the information is received from the web interface (or perhaps directly from data associated with scheduling software for the dental office, hair salon and so forth), the service bureau may filter this information and determine the sub-list of dental patients that have not been in for a cleaning for over six months, and then determine from that list which are in the community of stores or within a certain radius based on the location information associated with their device 204, or vehicle and so forth and determine which users will receive the specific offer.

Again, once the user receives a specific offer, it would be very helpful for an office such as a dental office to know whether that offer has been accepted such that they can schedule that particular time slot. Thus, in this case, it would be preferable that a simple dialog be established as is shown in FIG. 2B in which the user can opt to accept the proposed appointment. If the user accepts the appointment, then other options become available, such as notifying other users who receive the offer, but perhaps have not responded, that the offer is no longer available. Thus, conflict management processes may be in place in order to prevent a person from seeing an offer and attempting to accept the offer wherein the offer is no longer available. In this regard, a dialog may ensue in which alternate available time slots or offerings may be presented to the user once they are engaged with a particular opportunity, for example to receive a teeth cleaning appointment. Then, when the user proceeds to actually attending the appointment and receiving their teeth cleaning, the system will provide a discount to the user, and the processing that occurs at the dental office, hair salon, and so forth, is again no different inasmuch as the individuals are concerned but the user will receive notification of a rebate or discount. In this regard, there is no specific requirement of a rebate or discount being offered as an aspect of the invention, but may be offered as a further inducement to encourage the user to fill the particular time slot.

In a medical offering, the visit is offered accompanied by data entry that the person was_____ even though they may pay cash in a co-pay arrangement with insurance. Thus, the case association in this case may be an insurance card that identifies the redeemer of the offer and thus gets the discount.

Figure 7:
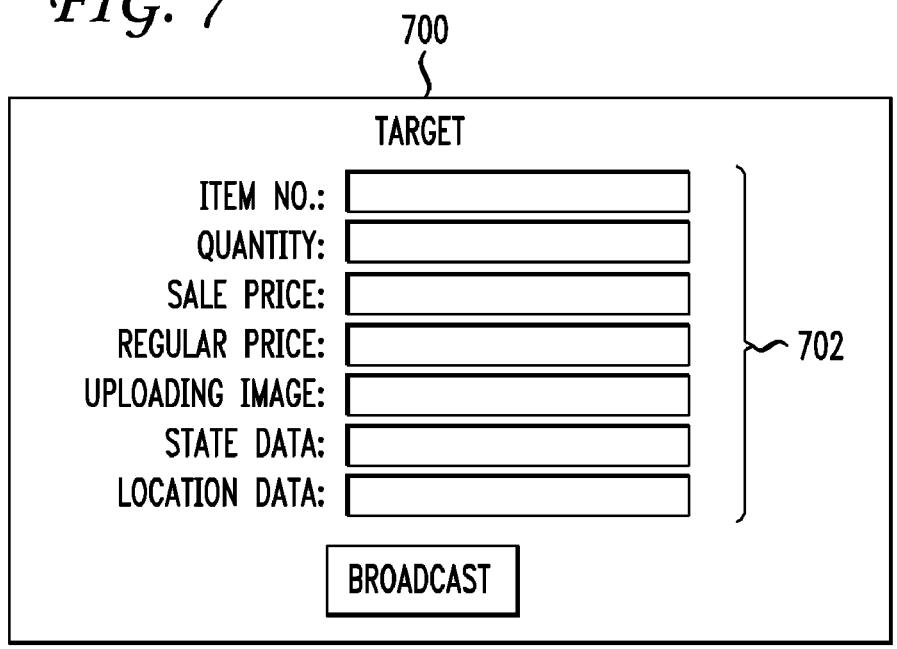
FIG. 7 illustrates an interface to enter items for sale.

FIG. 7 illustrates an interface 700 which relates to an embodiment associated with merchant being enabled to utilize a web interface to insert information about products that they would like to sell. For example, the merchant store, such as Target, may have a particular product that they would like to sell that day and perhaps provide a discount price. Here, a manager or other worker may go to the interface 700 on the internet and simply enter in information in various fields 702 such as the item number, quantity, sale price, and the regular price. Also included is an opportunity to upload an image of the particular product. Of course, as would be known in the art, various fields may be pre-populated to enable a simple insertion or identification of this information. Furthermore, this information may not be manually entered but may be automatically identified and populated in such an input field. For example, this approach may be where products that have been in the store for more than four months may be identified and put into this database as candidates for targeted advertisements according to the principles disclosed herein. Then, a button may be presented 703 which, in the manual aspect, may enable the manager to broadcast the sale. Then, once this information is entered into the database, then the service bureau can intelligently match the products with users based on the situation information about their location, state of devices such as vehicle or home products and so forth. Users are identified as candidates and then receive advertisements. In this case, as is disclosed herein, an advertisement is associated with that user's identification card and then transmitted to the user via the mobile device or another device as is disclosed above.

In another aspect of FIG. 7, a merchant can control situation information and the scope of their broadcast. For example, fields such as a situation data field and a location data field are provided that enable a merchant to choose the structure and scope of the offering. The merchant may desire to provide a small discount on oil changes that should go out to vehicles that have not had an oil change in over a year for those in zip codes within a radius of 10 miles to the store. This merchant-selectable filter can be input over a web-based interface by a merchant. In another example, assume a national car wash service desires to provide an offering. The entity can limit the offering to locations (such as zip codes) where it rained heavily over the past two days. Thus, external information from a source 218 may be provided as situation information with the location being also selected by the merchant. Default values can pre-populate fields as well. Variations on this concept of course are contemplated to provide the merchant with flexibility in structuring the offerings.

In yet another aspect, the merchant may set up accounts or triggered offerings. Here, the national car wash service may utilize an interface to establish an automatic triggering of an offering for those living within 30 miles of a business site after reports of rain or snow from source 218. Triggers may be established for those who have not come in for a car wash for 6 months at a certain discount and if they still do not come in after 9 months another discount. The merchant can therefore establish, based on their business model, history of sales and services in a community, and so forth, targeted advertisements using the various situation information that is available through the principles disclosed herein.

Figure 8:
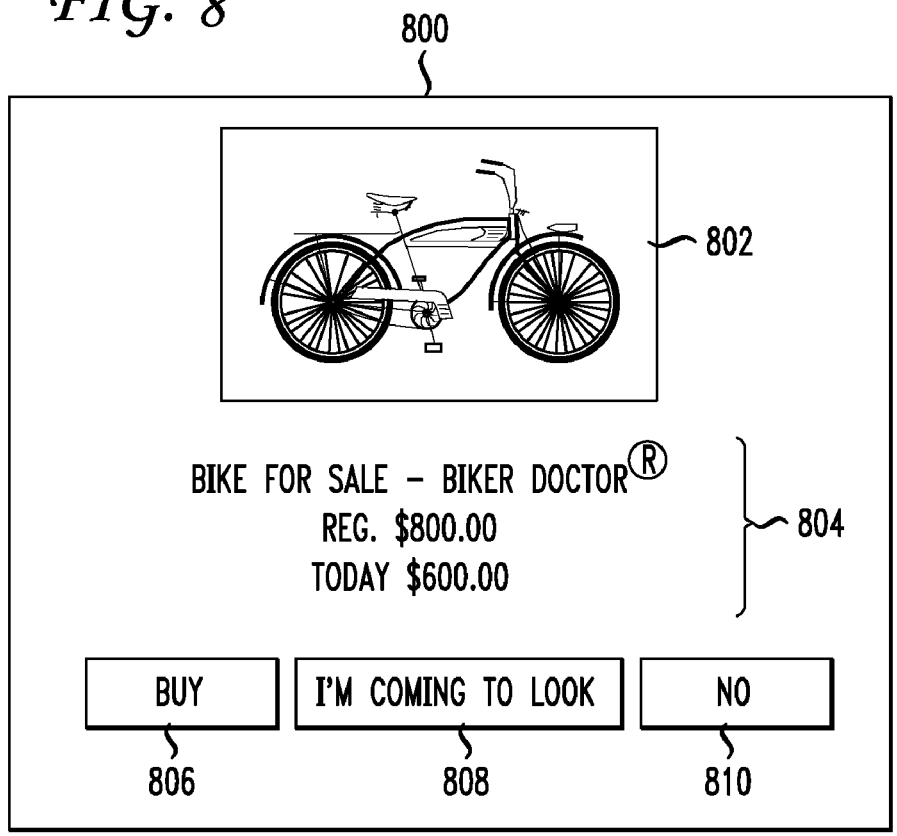
FIG. 8 illustrates a user interface for an offer for an item for sale in an auction.

FIG. 8 illustrates a user interface 800 which provides an example of such an advertisement. An image of a bike is shown 802 with information 804 about the bike and the retailer. The regular price and special price is shown. Options presented to the user may include buying 806, letting the vender know that the user is coming to look at the product 808 and a "no" option 810. Of course, other interactive options may be available which may be tailored for a small screen as would be often used on a mobile device. In this manner, the system may provide some feedback to the retailer such that once the broadcast goes out, and the item is perhaps being looked at by other customers in the store, the retailer can receive information, perhaps also on a mobile device to a manager or a sales person, that the bike has been purchased (and thus should be removed from the floor) or that they know that somebody is coming to look at it. This information may of course be used in several ways. The seller may notify a person currently in the store looking at the bike that they have received notification that somebody is coming to look at the bike which may prompt the current person in the store to purchase the product. Furthermore, inasmuch as the identification card is already identified with the advertisement 800. If the user does come to the store and purchase the bike, then they already received the discount price and there is no further negotiation which needs to occur in order for the user to simply purchase the bike using their card. Thus, the approach disclosed here similifies the ultimate transaction.

Figure 9:
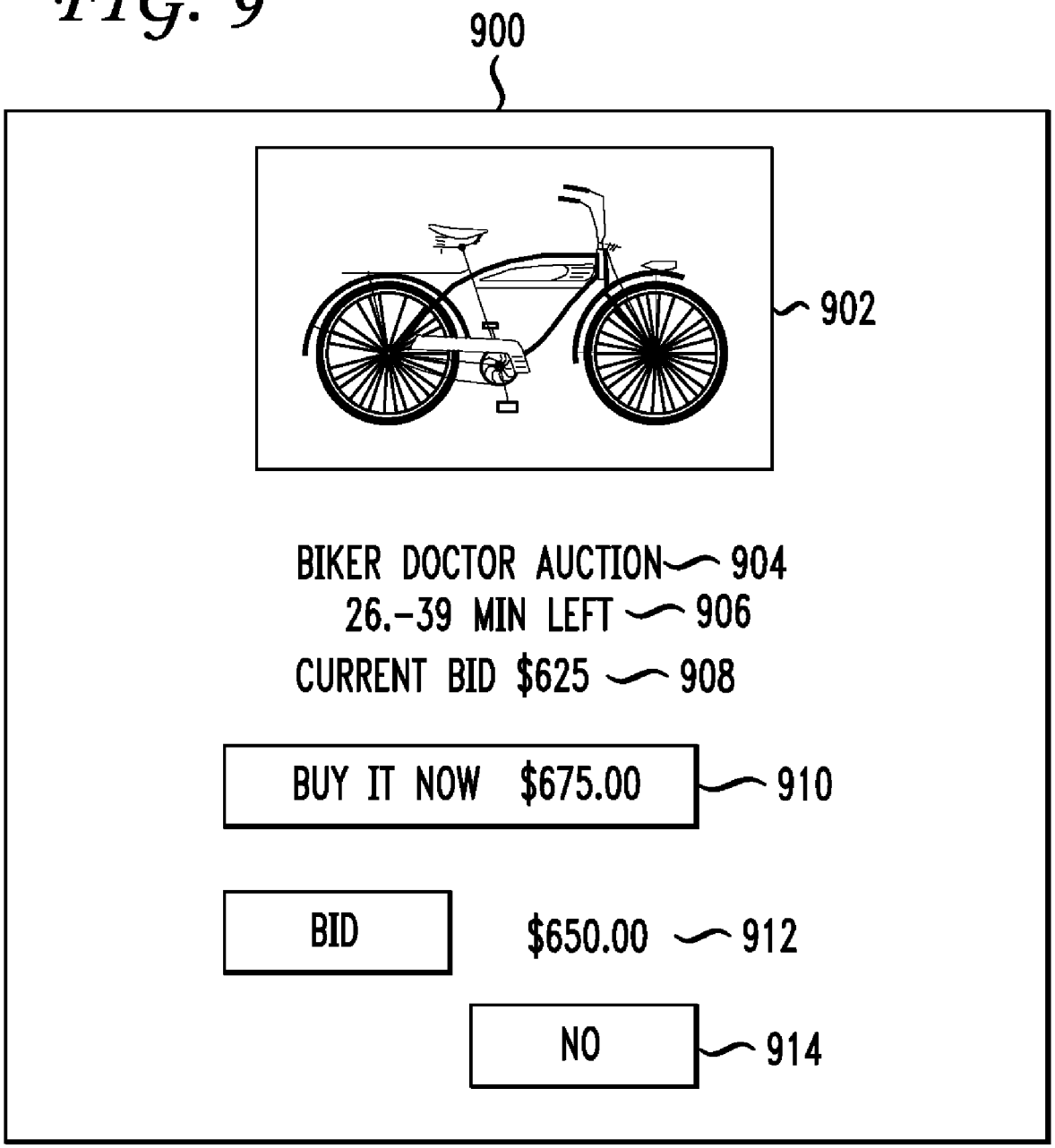
FIG. 9 illustrates an auction interface.

FIG. 9 illustrates a user interface 900 which embodies another aspect related to an auction. In this aspect, a group of users would be sent an advertisement or notification of the type shown in screen 900 with an image 902 such as a bike. Identification information identifies what the auction is about 904. A field 906 indicates how much time is left. Typically, these auctions would involve less time than an e-Bay type auction inasmuch as the geared audience may be five different users that are known to be approaching the store conducting the auction or people within the vicinity such as in the mall. A field 908 may indicate a current bid, while a filed 910 may indicate a buy it now option. Field 910 may enable the user to enter in a bid or button 914 may indicate that the user may not want to participate. Of course, other intelligence may be included such as situation information indicating that the user has recently surfed for bicycles on their home computer or any kind of product or service. In this aspect, the association of an identification card with the presentation of an auction enables several features. First, it enables the user to bid or buy now with a "one-click" purchasing enablement. Here, the user may simply buy it now and have the purchase processed via their identification card and enable them simply to proceed to the store and receive a receipt and take the product home. In another aspect, as could be understood from the basic concept disclosed herein, several users may simultaneously and within a short amount of time, engage in an auction via their mobile devices while they are in the vicinity of the store. Thus, if the user ultimately buys it now or wins in the bidding process, a notification can be provided on the product that this it no longer for sale and already has been purchased. Of course, further situation information may be received from a user which indicates what products they are going to look at. For example, a user may, either on a desktop computer or on their mobile device, provide information that they are going out for the day to shop for a bicycle and provide the basic parameters of the kind of bike they are looking for. This of course may influence the receipt of advertisements from various stores in the area as they are out shopping. With this information, intelligent processing matches the types of inventory, prices, potential sales and other offers and may be utilized to match advertisements to a user and can help point the user to particular products that they would actually be willing to purchase.

FIG. 10 illustrates a method embodiment of the discussion above. For example, the method includes the seller entering data on the web for broadcast (1000). Localized users then can receive notification of an auction (1002). Assume that the auction is finalized with a buyer. The seller receives notification of the purchase by a user (1004). The buyer then purchases the item via their identification card (1006) and the buyer receives the item at the auction price (1008). This process simplifies the entire business value chain and simplifies the process for the merchant and the user who purchases the product. Inasmuch as the backend processing by the service bureau handles the price and the information about the transaction, the actually sales person or store manager does not need to engage in any negotiation or any additional work which may slow down the completion of the transaction. Here, the business value chain is substantially shortened inasmuch as the user simply needs to go in and purchase the product in the normal way using their normal credit or other card and will receive the appropriate discounts. This of course is all enabled via the association in advance of the identification card with a particular advertisement auction or other notification of a product or service.

Now, many users have several credit cards, debit cards and club cards. An aspect of the present invention enables the users to register multiple different cards with the service. In this regard, if the user registered multiple cards, then an interaction may be engaged in which the user can select which credit card or debit card to use to make the purchase. The user, of course, can set up a user profile in which any or all of the cards may be associated with a particular transaction. Thus, if all identification cards apply, then the user may receive an advertisement indicating that all they need to do is purchase an item via any of their identification cards and the rebate will be received. However, in some cases, a particular credit card such as a particular credit card provider may be the one presenting the offer. In this case, then the advertisement or notification will also include instructions to use the American Express or Visa credit card to make the purchase to receive the rebate. In this scenario, then no dialog will ensue inasmuch as the user is receiving that offer from a particular credit card company and no selection needs to be made. However, in the context above relative to FIG. 4 in which a community of stores is involved, then a particular store may be making the offer and simply desire the user to come in. In this case, the user may be told that any credit card, club card, or cash may be used to redeem the offer. Thus, there is intelligence built in and managed by the service bureau 212 that simplifies and focuses these offering such that the association with a particular credit card may be presented in an efficient manner wherein the user can identify easily the mechanism by which the discount offer may be redeemed.

Embodiments within the scope of the present disclosure may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Tangible computer-readable media Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that are configured to control a processor in a system or device to perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps. Program modules may also comprise any tangible computer-readable medium in connection with the various hardware computer components disclosed herein, when operating to perform a particular function based on the instructions of the program contained in the medium.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Although the above description may contain specific details, they should not be construed as limiting the claims in any way. Other configurations of the described embodiments of the invention are part of the scope of this invention. For example, any type of service may be contemplated in the community of stores. For example, eye doctors and eye screening services, auto services, framing services, cleaning services, legal services, and so on. Any entity or company that provides services in which people are scheduled to arrive, may register or communicate via the internet or any other mechanism with an aspect of the present invention in which the time slots that become available can be matched with the various situation-based information associated with a user such that when a certain threshold is met, an offering can be transmitted to one or more users in order to efficiently fill in those open time slots. Furthermore, any point of sale scenario may be applicable to the principles herein. The user does not have to physically be at a store location but web-based sales, telephone call in sales where a user provides a card number, and so forth can all be tied into this system. Accordingly, the appended claims and their legal equivalents should only define the invention, rather than any specific examples given.

We claim:

1. A computer-implemented method of transmitting an advertisement to a user computing device and completing a transaction associated with the advertisement, the method comprising:
    receiving via a processor situation information;
    based on the situation information, transmitting via a processor an advertisement to the user computing device, wherein the advertisement is (1) associated with an identification card, (2) transmitted independent of any user solicitation for a communication and independent of a request for a product or a service, and (3) configured such that no user interaction with the user computing device is necessary to redeem a coupon associated with the advertisement; and
    receiving an indication at a point of sale device of a purchase associated with the advertisement transmitted to the user computing device and completed using the identification card on the point of sale device, wherein the user computing device differs from the point of sale device and wherein the purchase at a point of sale is at full price and a rebate associated with the coupon is made to the user on an identification card statement.

2. The computer-implemented method of claim 1, further comprising presenting the rebate on the identification card statement after receiving an indication of the purchase associated with the advertisement.

3. The computer-implemented method of claim 1, wherein the situation information includes location information.

4. The computer-implemented method of claim 1, wherein the situation information includes a status of at least one computing device associated with a user.

5. The computer-implemented method of claim 1, wherein the purchase associated with the advertisement and completed using the identification card is performed transparent to whether a rebate is provided at the point of sale device.

6. The computer-implemented method of claim 1, wherein transmitting an advertisement to the user computing device further comprises communicating with a database of merchant offers to select the transmitted advertisement.

7. The computer-implemented method of claim 1, wherein the situation information further includes environmental information.

8. The computer-implemented method of claim 1, further comprising transmitting a notification to the user computing device after receiving the indication of the purchase of a confirmation of a discount associated with the purchase.

9. The computer-implemented method of claim 1, wherein the card identification is one of a credit card or debit card.

10. A system for transmitting an advertisement to a user computing device and completing a transaction associated with the advertisement, the system comprising:
    a processor;
    a first module that controls the processor to receive situation information;
    a second module that controls the processor, based on the situation information, to transmit an advertisement to the user computing device, wherein the advertisement is (1) associated with an identification card, (2) transmitted independent of any user solicitation for a communication and independent of a request for a product or a service, and (3) configured such that no user interaction with the user computing device is necessary to redeem a coupon associated with the advertisement; and
    a third module that controls the processor to receive an indication at a point of sale device of a purchase associated with the advertisement transmitted to the user computing device and completed using the identification card on the point of sale device, wherein the user computing device differs from the point of sale device and wherein the purchase is at full price and a rebate associated with the coupon is made to the user on an identification card statement.

11. The system of claim 10, further comprising a fourth module that controls the processor to present the rebate on the identification card statement after receiving an indication of the purchase associated with the advertisement.

12. The system of claim 10, wherein the situation information includes location information.

13. The system of claim 10, wherein the situation information includes a status of at least one computing device associated with a user.

14. The system of claim 10, wherein the purchase associated with the advertisement and completed using the identification card is performed transparent to whether a rebate is provided at the point of sale device.

15. The system of claim 10, wherein the second module further communicates with a database of merchant offers to select the transmitted advertisement.

16. The system of claim 10, wherein the situation information further includes environmental information.

17. The system of claim 10, further comprising a fourth module that controls the processor to a notification to the user computing device after receiving the indication of the purchase of a confirmation of a discount associated with the purchase.

18. The system of claim 10, wherein the card identification is one of a credit card or debit card.

19. A computer-implemented method of providing an advertisement to a user computing device and managing a user purchased based on the advertisement, the method comprising:

receiving via a processor situational information associated with a user, the situational information being independent of manual user input to the user computing device;

based on the situational information, transmitting via a processor an advertisement with a discount from a full-price to the user computing device from a computer system, wherein the advertisement is (1) associated with a purchasing card of the user, (2) transmitted independent of any user solicitation for a communication and independent of a request for a product or a service, and (3) configured such that no user interaction with the user computing device is necessary to redeem the discount;

receiving an indication of a user purchase completed with the purchasing card at a point of sale device that is different from the user computing device, the purchase associated with the advertisement transmitted to the user computing device, wherein the discount associated with the user purchase is processed by the computer system, and the purchase at the point of sale is at full price; and transmitting a purchasing card statement including a rebate associated with the discount being made to the user for the purchase.

* * * * *